US011383569B2

(12) United States Patent
Stangl

(10) Patent No.: US 11,383,569 B2
(45) Date of Patent: Jul. 12, 2022

(54) REAR AXLE OF A VEHICLE

(71) Applicant: Bayerische Motoren Werke Aktiengesellschaft, Munich (DE)

(72) Inventor: Matthias Stangl, Dachau (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 17/270,312

(22) PCT Filed: Aug. 19, 2019

(86) PCT No.: PCT/EP2019/072077
§ 371 (c)(1),
(2) Date: Feb. 22, 2021

(87) PCT Pub. No.: WO2020/038855
PCT Pub. Date: Feb. 27, 2020

(65) Prior Publication Data
US 2021/0170822 A1  Jun. 10, 2021

(30) Foreign Application Priority Data
Aug. 23, 2018 (DE) ...................... 10 2018 214 289.0

(51) Int. Cl.
*B60G 3/20* (2006.01)
*B60G 7/02* (2006.01)
*B62D 21/11* (2006.01)

(52) U.S. Cl.
CPC ................ *B60G 3/20* (2013.01); *B60G 7/02* (2013.01); *B60G 2200/422* (2013.01);
(Continued)

(58) Field of Classification Search
CPC ...... B60G 3/20; B60G 7/02; B60G 2200/422; B60G 2204/143; B60G 2204/422;
(Continued)

(56) References Cited

U.S. PATENT DOCUMENTS 6,755,429 B1 * 6/2004 Buchwitz ................. B60G 3/18
280/124.109
10,745,051 B2 * 8/2020 Tanaka .................... B62D 21/11
(Continued)

FOREIGN PATENT DOCUMENTS

DE         103 06 098 B3    9/2004
DE    10 2005 049 947 A1    5/2007
(Continued)

OTHER PUBLICATIONS

International Search Report (PCT/ISA/210) issued in PCT Application No. PCT/EP2019/072077 dated Nov. 21, 2019 with English translation (seven (7) pages).
(Continued)

*Primary Examiner* — Darlene P Condra
(74) *Attorney, Agent, or Firm* — Crowell & Moring LLP

(57) ABSTRACT

A rear axle of a two-track vehicle includes a plurality of wheel-control links with at least one spring link for supporting a bearing spring on a vehicle body of the vehicle, which wheel-control links connect a rear wheel of the vehicle to a rear axle carrier. The rear axle carrier includes at least two longitudinal members oriented at least approximately in the longitudinal direction of the vehicle and at least one crossmember oriented at least approximately in the transverse direction of the vehicle. The rear axle carrier is attached to the vehicle body via two bearing points on each side of the vehicle, as viewed with respect to the longitudinal center axis of the vehicle. The spring link and at least one of the wheel-control links are attached to the longitudinal member. The attachment of the spring link to one longitudinal member in each case is arranged, as viewed in the travel direction of the vehicle, upstream of the center of the distance between the bearing points arranged on a common side of the vehicle.

10 Claims, 2 Drawing Sheets

(52) U.S. Cl.
CPC .. *B60G 2204/143* (2013.01); *B60G 2204/422* (2013.01); *B62D 21/11* (2013.01)

(58) Field of Classification Search
CPC .......... B60G 2200/18; B60G 2200/466; B60G 2204/1244; B60G 2204/15; B60G 2204/18; B60G 2206/602; B60G 2206/604; B60G 2300/50; B62D 21/11
See application file for complete search history.

(56) References Cited

U.S. PATENT DOCUMENTS

| | | | | |
|---|---|---|---|---|
| 2003/0107200 | A1* | 6/2003 | Huang | B62D 3/12 |
| | | | | 280/93.515 |
| 2013/0168939 | A1 | 7/2013 | Buschjohann et al. | |
| 2013/0292932 | A1 | 11/2013 | Stenzenberger et al. | |
| 2014/0117654 | A1* | 5/2014 | Buschjohann | B60G 3/18 |
| | | | | 280/795 |
| 2014/0265201 | A1* | 9/2014 | Luttinen | B60G 7/006 |
| | | | | 280/93.512 |
| 2014/0291951 | A1* | 10/2014 | Zandbergen | B60G 11/16 |
| | | | | 280/79 |
| 2014/0375013 | A1* | 12/2014 | Zandbergen | B60G 3/20 |
| | | | | 280/124.109 |
| 2015/0367705 | A1* | 12/2015 | Schmitt | B60G 21/0551 |
| | | | | 280/124.106 |
| 2017/0015173 | A1* | 1/2017 | Battaglia | B60G 3/18 |
| 2018/0281860 | A1* | 10/2018 | Tanaka | B60G 99/002 |
| 2019/0283522 | A1* | 9/2019 | Battaglia | B60K 17/043 |

FOREIGN PATENT DOCUMENTS

| | | |
|---|---|---|
| DE | 10 2011 081 836 A1 | 2/2013 |
| DE | 10 2013 007 976 A1 | 11/2014 |
| DE | 10 2015 223 280 A1 | 6/2017 |
| EP | 2 663 463 B1 | 10/2014 |
| WO | WO 2012/059078 A2 | 5/2012 |
| WO | WO 2018/041471 A1 | 3/2018 |

OTHER PUBLICATIONS

German-language Written Opinion (PCT/ISA/237) issued in PCT Application No. PCT/EP2019/072077 dated Nov. 21, 2019 (six (6) pages).

German-language Search Report issued in German Application No. 10 2018 214 289.0 dated Aug. 8, 2019 with partial English translation (12 pages).

* cited by examiner

REAR AXLE OF A VEHICLE

BACKGROUND AND SUMMARY OF THE INVENTION

The invention relates to a rear wheel suspension system and to a rear axle of a vehicle. Regarding the prior art, reference is made by way of example to DE 10 2005 049 947 A1, DE 10 2011 081 836 A1, EP 266 3463 B1 and DE 10 2013 007 976 A1.

The invention relates to an axle, in particular a rear axle, and to a wheel suspension system of a rear wheel of a motor vehicle with an axle carrier, a propulsion unit which is suspended on the axle carrier for driving the wheels of the axle, and a plurality of wheel control links which are supported on the axle carrier. With respect to the prior art, reference is made by way of example to DE 10 2005 049 947 A1 which discloses a rear axle carrier which is customary nowadays and is called a subframe in the document, whereas DE 10 2011 081 836 A1 which, furthermore, is mentioned by way of example, discloses a proposal for the design of an electrically driven axle or an axle carrier which is designed in a special way in this regard.

In particular, in the case of passenger cars which have consistently been driven by internal combustion engine in practice up to now, the trend toward electrification, that is to say toward a drive (possibly additionally) by electric motor, has a significant effect on the structural design of the chassis region of the motor vehicles. In addition to the axle and the wheel suspension system per se, namely, for example, the arrangement of its wheel control (guide) links, the axle carriers which are widespread in passenger cars for manufacturing and comfort reasons are also particularly affected by this development, inter alia because an electric motor propulsion unit which is to be provided in the region of the axle carrier or of a rear axle carrier of a passenger car which is equipped with rear wheel drive requires considerably more installation space and has a higher weight than a rear axle drive which has been provided there (solely) up to now.

In addition to known, at least approximately rectangular axle carriers (as indicated in DE 10 2005 049 947 A1), axle carriers of vehicles are also known which comprise only a single crossmember and two longitudinal carriers. As can be seen in EP 266 3463 B1 in a plan view of the axle carrier, for example, they are then of at least approximately U-shaped configuration. The respective wheel control links, in particular what is known as a spring link (which is capable of supporting the bearing spring of the vehicle with respect to the vehicle body), are usually fastened or attached to the longitudinal carriers here.

A rear axle carrier with only a single crossmember is likewise indicated in DE 10 2013 007 976 A1, in the case of which a propulsion unit is installed into the crossmember or into its housing. In this case, (only one) link attachment can also be seen very far behind on the longitudinal carrier, as viewed in the vehicle driving direction. An arrangement of this type of a spring link comparatively far toward the rear of the longitudinal carrier is required, in particular, on account of a lack of installation space in the region of the wheel suspension system. This is because, in particular, the electric motor and the output shaft have to be accommodated in the region of the axle carrier and/or the wheel suspension system.

Depending on drive loads, however, an axle carrier construction or rear wheel suspension system described from the prior art with a described attachment of the spring link relatively far toward the rear on the longitudinal carrier can lead to very pronounced loading of the rear axle carrier bearings in the vehicle vertical direction. Accordingly, the bearings have to be of greater dimensions and are therefore more complex and more expensive.

It is therefore an object of the invention to provide a rear axle of a vehicle, which rear axle is capable of solving the described conflict of objectives between the installation space with regard to the arrangement of the propulsion unit and the links and that of a lower loading of the rear axle carrier bearings.

The object is achieved by way of a rear axle with the features according to the independent claim. Advantageous embodiments and developments are the subject matter of the dependent claims.

Here, a rear axle, in particular used as a rear wheel suspension system and a rear axle carrier of a passenger car, is preferably provided which makes it possible in a particularly efficient way to arrange a (preferably electric motor) propulsion unit for the vehicle within the axle carrier, and at the same time to attach a plurality of wheel control links of the double track vehicle in a favorable way in terms of driving dynamics (with regard to the kinematics and elastokinematics of the links and/or the wheels which are guided by way of them) in an at least partially articulated manner to the axle carrier of the double track vehicle.

To this end, moreover, a rear wheel suspension system, in particular of a driven rear axle of a vehicle, is provided. Here, the rear wheel suspension system or rear axle comprises at least one so-called spring link, on which a bearing spring of the vehicle is mounted, which bearing spring is in turn supported on the vehicle body. Here, the spring link is preferably configured as a control arm which, further preferably, is arranged in a lower link plane. The lower link plane describes a (quasi-horizontal) plane which, inter alia, is defined by the wheel control spring link and further links and, as viewed on the vehicle vertical axis, is provided below the wheel rotational axis.

Here, a control arm within the context of this invention describes a link which, in the installed state on the vehicle, is oriented at least approximately or substantially in the vehicle transverse direction.

In addition to the supporting or carrying of the spring, moreover, the spring link connects a rear axle carrier to a wheel support of the vehicle.

Here, the rear axle carrier comprises at least two longitudinal carriers which are oriented at least approximately in the vehicle longitudinal direction, and at least one crossmember which is oriented at least approximately in the vehicle transverse direction. Here, the rear axle carrier particularly preferably comprises precisely one crossmember and precisely two longitudinal carriers. Here, the two preferred longitudinal carriers and the one preferred crossmember together form an at least approximately H-shaped or at least approximately U-shaped rear axle carrier.

Furthermore, it is preferably provided that the vehicle can be driven by electric motor, and the rear axle of the vehicle can be driven by way of a propulsion unit or motor/transmission unit, in particular an electric motor, which is arranged on the rear axle carrier. As an alternative to an electric motor, the propulsion unit can also be configured by way of internal combustion engine. Here, the propulsion unit is further preferably arranged in a receptacle of the rear axle carrier in the clearance between the crossmember and the two longitudinal carriers and behind the crossmember in the vehicle driving direction (in the case of forward driving). Here, in each case one rear wheel is further preferably connected via an output shaft to the propulsion unit or motor/transmission unit. Here, the propulsion unit is preferably supported at at least two points on the rear axle carrier of the vehicle. It is possible here that the propulsion unit is supported at two points on the rear axle carrier (for example, on the crossmember) and at two further points on the vehicle body of the vehicle. As an alternative, it is also possible that the propulsion unit is not supported on the rear axle carrier.

Here, the rear axle carrier is connected to the vehicle body. To this end, the rear axle carrier is connected via at least four bearing points to the vehicle body. Here, in each case two bearing points are situated on in each case one vehicle side, as viewed with regard to the vehicle longitudinal center axis or vehicle longitudinal center line. In other words, in each case two bearing points of the rear axle carrier are situated on a right-hand vehicle side, and two bearing points are situated on a left-hand vehicle side. Here, the bearing points are preferably arranged at the two ends of the longitudinal carriers or the rear axle carrier as viewed in the vehicle longitudinal direction (as viewed along the length of the longitudinal carrier). In other words, the rear axle carrier or the longitudinal carrier comprises a bearing point which is arranged at its front end (in the vehicle driving direction), and a bearing point which is arranged at its rear end, by way of which the rear axle carrier is attached to the vehicle body, preferably with the aid of suitable rear axle carrier bearings. Rear axle carrier bearings of this type can be, for example, rubber bearings or hydraulic bearings. For the sake of simplicity, the bearing points are assigned to the longitudinal carriers at this point, it being just as possible for them to also be assigned to the crossmember. Here, the bearings are preferably situated in each case at the transition points of the crossmember and longitudinal carrier. In the case of only a single crossmember, in each case one bearing point is then arranged at the open end of each longitudinal carrier as viewed in the vehicle driving direction.

Furthermore, it is provided that the attachment of the spring link to the longitudinal carrier is arranged in front of the center of the spacing of the two bearing points of the longitudinal carrier as viewed in the vehicle driving direction (in the case of forward driving of the vehicle). Here, the two longitudinal carrier bearings are arranged on a common vehicle side (that is to say, the right-hand or the left-hand side) with regard to the vehicle longitudinal center line. Furthermore, it is preferably provided that the attachment of the spring link is arranged in front of the wheel rotational axis or in front of the output shaft of the propulsion unit or motor/transmission unit as viewed in the vehicle driving direction.

Here, the attachment of the spring link to the longitudinal carrier is particularly preferably arranged in the front third (as viewed in the vehicle driving direction in the case of forward driving of the vehicle) of the longitudinal carrier. Here, the attachment of the spring link is particularly advantageously attached in the immediate vicinity of the front rear axle carrier bearing or the front bearing point of the longitudinal carrier.

As a result of an arrangement of this type of the attachment of the spring link or of the camber link in front of the center of the two bearing points on the longitudinal carrier, the loads on the rear axle carrier bearings, in particular the loads on the rear rear axle carrier bearing, can be reduced considerably.

Here, the load introduction on the longitudinal carrier takes place by way of the spring link or by way of its attachment to the longitudinal carrier, the drive torque of the vehicle being supported on the two rear axle carrier bearings.

The bearing spring lies on the spring link, support being carried out on the rear axle carrier via the lever ratios of the spring link to a part of the wheel contact force. Here, the load direction is downward as viewed in the vehicle vertical direction. Here, a drive torque for forward driving, in particular in the case of acceleration of the vehicle or in the case of relatively high drive torques, is supported on the rear axle carrier and on the vehicle body as viewed in the clockwise direction. Depending on the number of bearing points of the drive unit on the rear axle carrier, the drive torque is supported more or less on the rear axle carrier bearings. Therefore, if the drive unit is attached, for example, at four bearing points to the rear axle carrier, of which two are situated, in the vehicle driving direction, in front of and two are situated behind the wheel rotational axis or the center according to the invention of the spacing, the drive torque is supported on the front rear axle carrier bearings via the lever arm between the bearings as a force in the upward direction as viewed in the vehicle vertical direction, whereas the rear axle carrier bearings experience the same force, but in the downward direction as viewed in the vehicle vertical direction. Therefore, in the case of a spring link attachment behind the wheel rotational axis or the center according to the invention of the spacing of the two bearings from one another as viewed in the vehicle driving direction, the superimposition of the drive and wheel contact forces leads to an addition of the forces consisting of driving and wheel contact force, whereas, in the case of an attachment of the spring link in front of the center of the spacing, the forces are subtracted, since they act in different directions.

If, for example, the drive unit is mounted on the rear axle carrier only at two points (for example, in the case of the use of a single crossmember), the wheel contact forces are likewise predominantly compensated for by way of the drive forces in the case of an arrangement according to the invention of the spring link in front of the center of the spacing of the rear axle carrier bearings which are arranged in each case on a common vehicle side. In a constellation of this type, accordingly, the rear axle carrier bearings, in particular the rear rear axle carrier bearings and, in particular, in the case of a great acceleration of the vehicle, are accordingly loaded to a small extent. A compensation of this type of the wheel contact forces by way of the drive forces is therefore influenced at least to a small proportion by the position and the number of bearings of the drive unit on the rear axle carrier. Nevertheless, the described effect can be determined even without a mounting of the drive unit on the rear axle carrier (admittedly to a small extent).

Here, the further forward on the longitudinal carrier the attachment of the spring link to the longitudinal carrier is arranged as viewed in the vehicle driving direction (in the case of forward driving), the lower the sum of the loads on the bearing points of the longitudinal carrier or on the rear axle carrier bearings becomes. As a result, in particular in the case of relatively high drive torques, the drive forces can compensate for the preloading on the front rear axle carrier bearing (in particular, in the case of only one bearing on in each case one vehicle side of the drive unit on the rear axle carrier).

The two rear axle carrier bearings of each longitudinal carrier (in particular, the rear rear axle carrier bearing) experience lower loads as a result of the rear wheel suspension system or rear axle according to the invention, in particular during operation of the vehicle and, in particular, in the case of high drive torques. The operational durability of the rear axle carrier bearings or, in particular, of the rear rear axle carrier bearing can be increased in this way, and/or the rear axle carrier bearings can be designed and dimensioned to be smaller and more compact. This in turn saves installation space, costs and complexity.

As has already been mentioned further above, an H-shape as viewed in a plan view of the installed rear axle carrier in the vehicle is preferred for the rear axle carrier. Accordingly, the rear axle carrier preferably comprises a single crossmember which is connected to the (two) longitudinal carriers in such a way that the rear axle carrier is of at least approximately H-shaped configuration in its installed state in the vehicle. In contrast to a known U-shape, the crossmember is not attached to one of the two ends of the longitudinal carriers, but rather is attached substantially at a suitable point along the longitudinal carriers, with the result that there is still a sufficient length of the longitudinal carriers both in front of the crossmember and also behind the crossmember, as viewed in the vehicle driving direction.

As an alternative to the H-shape, a U-shape of the rear axle carrier is also conceivable.

An abovementioned single crossmember is in no way absolutely necessary for the invention, and is one preferred embodiment. The rear axle according to the invention can likewise be implemented by way of a rear axle carrier which comprises two longitudinal carriers and two crossmembers.

Here, the single crossmember is particularly preferably arranged at least approximately centrally between the two link attachments of each longitudinal carrier to the longitudinal carriers, which link attachments are at the greatest spacing from one another as viewed in the vehicle longitudinal direction. In other words, the crossmember is attached to in each case one longitudinal carrier in each case at that point which is arranged substantially centrally between the two most exposed link attachment points (that is to say, those link attachment points which are furthest away from one another) on the longitudinal carrier. Therefore, a plurality of links, in particular links of the lower link level, are preferably attached to in each case one longitudinal carrier.

By way of an arrangement of this type of the crossmember on the longitudinal carriers (that is to say, centrally between the two most exposed link attachment points on the longitudinal carrier), satisfactory rigidities of the rear axle carrier with regard to the loads, in particular in the case of a driven rear axle, during operation of the vehicle can be achieved. Here, more detailed explanations can be gathered from the description of the figures.

These and further features are also apparent from the drawings in addition to the claims and the description, it being possible for the individual features to be realized in each case per se on their own or combined in the form of sub-combinations in the case of one embodiment of the invention, and to represent advantageous embodiments which are patentable per se, for which embodiments protection is claimed herein.

In the following text, the invention will be described in further detail on the basis of one exemplary embodiment. Here, all of the features which are described in greater detail can be essential to the invention.

DETAILED DESCRIPTION OF THE DRAWINGS

Figure 1:
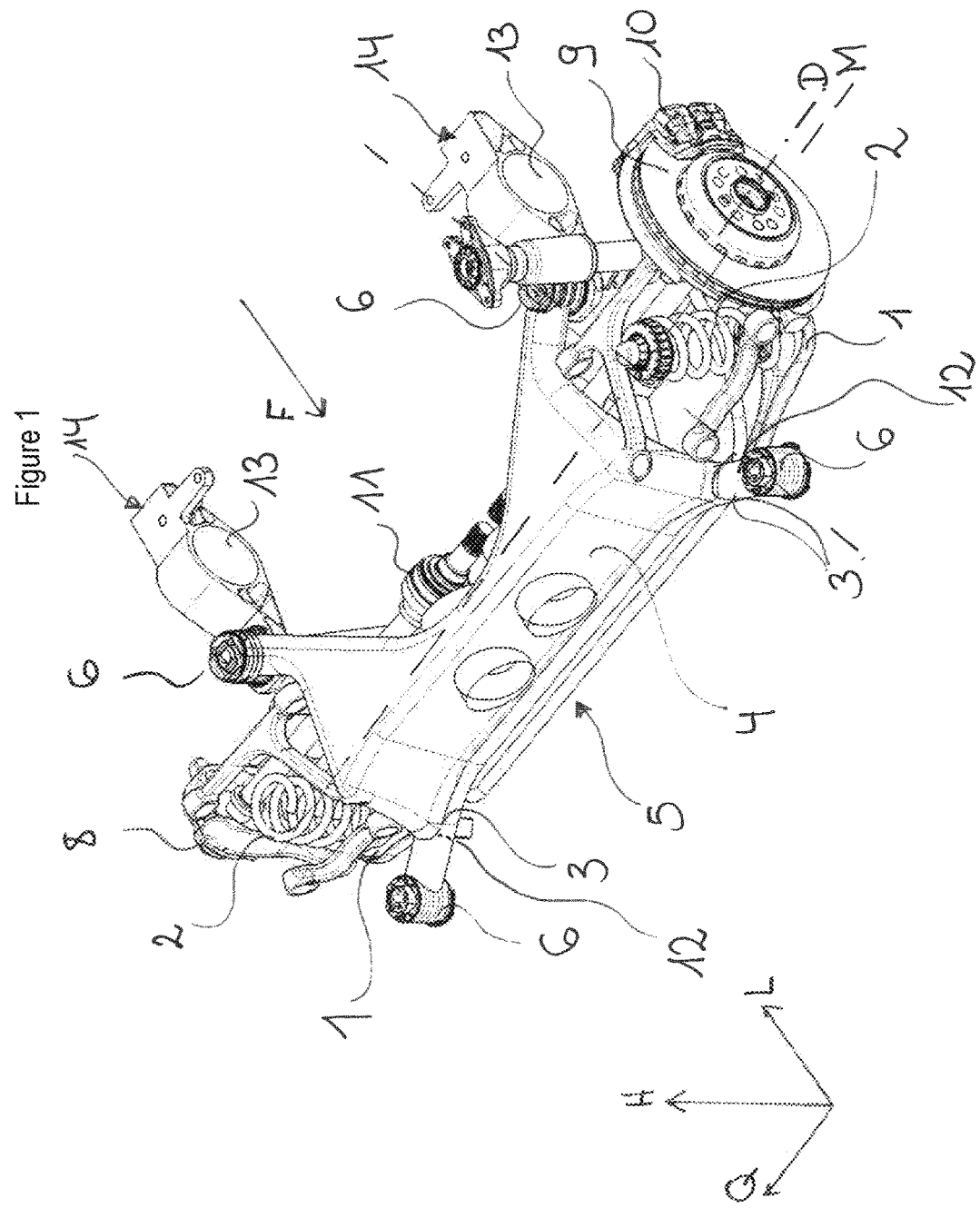
FIG. 1 shows an exemplary rear axle according to the invention of a double track vehicle in a three-dimensional view obliquely from behind.

FIG. 1 diagrammatically shows one exemplary embodiment of a rear axle according to the invention of a double track vehicle. Here, the rear axle comprises a plurality of wheel control links which are shown merely diagrammatically, only their position of the attachment to the rear axle carrier 5 being indicated (but not their precise attachment). Here, the rear axle carrier comprises, in particular, what is known as a spring link 1 which supports a bearing spring 2 which is in turn supported by way of its upper end (as viewed in the vehicle vertical direction H) on a vehicle chassis or vehicle body (not illustrated). Furthermore, the rear axle comprises a wheel suspension system with a plurality of the wheel control links (merely diagrammatically indicated attachment of the links) and with, in each case, one wheel support 8 and the bearing spring 2. Moreover, a brake disk 9 and a brake caliper 10 of a wheel are indicated diagrammatically on one side of the rear axle. Furthermore, the rear axle comprises an electric motor propulsion unit (not illustrated in FIG. 1) which is suspended on the rear axle carrier 5 and which can drive the rear wheels (likewise not indicated) of the vehicle via a drive shaft 11.

Furthermore, the rear axle carrier 5 comprises two longitudinal carriers 3 (can be seen, in particular, in FIG. 2) which are oriented at least approximately in the vehicle longitudinal direction L, and a single crossmember 4 which is oriented at least approximately in the vehicle transverse direction Q. Here, an at least approximate orientation of the longitudinal carriers 3 and the crossmember 4 in a certain direction means a rough orientation in a respective direction, it certainly being possible for the longitudinal carriers 3 and the crossmember 4 to differ from the direction at individual points and regions. The crossmember 4 connects, for example, the longitudinal carriers 3 which are arranged in each case on one wheel side to one another, with the result that the crossmember 4 has to be oriented substantially in the vehicle transverse direction Q. Therefore, the crossmember 4 is oriented at least approximately in the vehicle transverse direction Q.

Furthermore, the crossmember 4 in this example is configured as a single crossmember 4 of the rear axle carrier 5. Furthermore, as viewed in a plan view of the rear axle carrier 5, the crossmember 4 forms a, at least approximately, H-shaped rear axle carrier 5 together with the longitudinal carriers 3. The at least approximate H-shape comes about by virtue of the fact that the crossmember 4 does not connect the longitudinal carriers on, in each case, one wheel side to one another at their ends as viewed in the vehicle longitudinal direction L of the longitudinal carriers 3 (this would then be a U-shape), but rather in a somewhat more central manner.

More precisely, the crossmember is arranged here on, in each case, one longitudinal carrier 3 at least approximately in the center of the spacing between the two link attachment points of a longitudinal carrier 3 which are spaced apart furthest from one another. In this specific case, as can be seen in the side view from FIG. 2, the attachment 12 of the spring link 1 and the attachment of a further control arm 16 form the link attachment points on the longitudinal carrier 3 which are spaced apart furthest from one another.

By way of an arrangement of this type of the crossmember 4 on the longitudinal carriers 3 (that is to say, centrally between the two most exposed link attachment points on the longitudinal carrier 3), satisfactory stiffnesses of the rear axle carrier 5 with regard to the loads, in particular in the case of a driven rear axle, can be achieved during the operation of the vehicle.

Here, the rear axle carrier 5 is supported or mounted via four axle carrier bearings 6 on a body (not shown) of the vehicle. Here, as viewed in the vehicle longitudinal direction L, in each case one axle carrier bearing 6 is situated at the front end of each longitudinal carrier 3, and in each case one axle carrier bearing 6 is situated at the rear end of each longitudinal carrier 3. If the position of the crossmember 4 with regard to the two longitudinal carriers 3 is described with regard to the attachment positions or attachment points of the links along each longitudinal carrier 3, the crossmember is arranged with regard to the two longitudinal carriers 3 at least approximately centrally between two link attachment points which are spaced apart furthest from one another (as viewed in the vehicle longitudinal direction L).

Here, the axle carrier bearings 6 are configured as a rubber bearing. The rubber bearing comprises a metallic core which is surrounded by a sleeve. Here, a rubber element for elastic mounting is arranged between the metallic core and the sleeve. Via a suitable screw connection through the core, the bearings 6 can be connected to the body of the vehicle (in the vehicle vertical direction H). If each longitudinal carrier 3 is then considered (otherwise, the wheel suspension systems of the rear axle are arranged with respect to one another in each case symmetrically with regard to the vehicle longitudinal center axis), the respective links are attached between the two axle carrier bearings 6 to the latter as viewed in the longitudinal direction of the longitudinal carrier 3 or in the vehicle longitudinal direction L.

Figure 2:
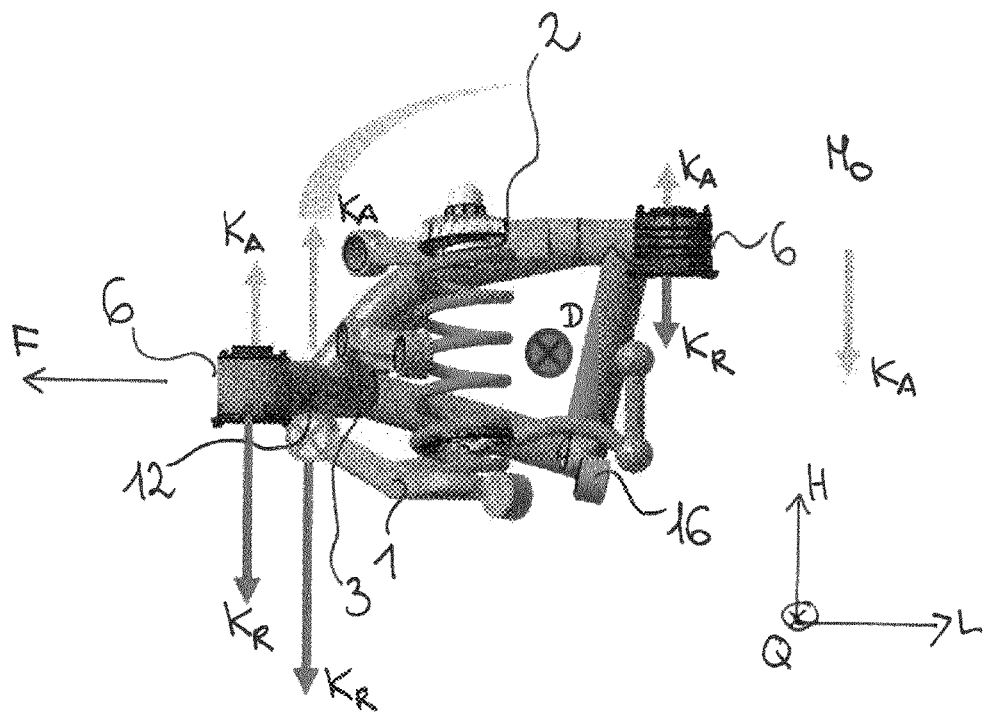
FIG. 2 diagrammatically indicates a side view of the rear axle from FIG. 1 with the forces and torques which act on it.

As can be seen, in particular, in a side view of the rear axle in FIG. 2 (here, the brake disk 9 and the brake caliper 10 are not also shown for the sake of clarity), it is provided that the attachment 12 of the spring link 1 to the longitudinal carrier 3 is arranged on, in each case, one longitudinal carrier 3 in front of the center M of the spacing of the two bearing points of the axle carrier bearing 6, as viewed in the vehicle driving direction F, along the length of the longitudinal carrier 3. In this specific case, the attachment 12 of the spring link 1 is even situated in the immediate vicinity, directly (as viewed in the vehicle driving direction) in front of the front axle carrier bearing 6.

As can likewise be gathered from FIG. 2, the spring link 1 is arranged in what is known as a lower link plane. The lower link plane describes a (quasi-horizontal) plane which is defined, inter alia, by the wheel control spring link and further links and is provided below the wheel rotational axis D as viewed on the vehicle vertical axis H.

Here, FIG. 2 shows the respective forces K and torques M which can act on the rear axle carrier 5 during driving of the vehicle. Here, a load-optimized rear axle is shown by way of the attachment 12 of the spring link 1 in front of the center M of the two axle carrier bearings 6. The load introduction of the wheel loads KR (that is to say by the links (in the vehicle vertical direction H) and the bearings themselves) is opposed to the loads KA which are produced on account of the driving of the axle. Here, the bearing loads on the axle carrier bearing 6 are in turn dependent on the drive torque MO (the rotational axis D or drive axis). Here, the drive torque MO is supported by way of the drive load KA on the axle carrier bearings 6. In addition, the rear axle load is increased in the case of driving, which leads to the reaction force from the spring link 1 on the rear axle carrier additionally increasing. The bearing load (on the axle carrier bearings 6) is therefore defined by way of the sum of the overall forces which occur. The higher the drive torque MO is here, the lower the sum of the bearing loads (during operation of the vehicle). The further the spring link 1 is therefore arranged or attached in the direction of the front axle carrier bearings 6, the greater the drive torque MO becomes during operation of the vehicle (the front axle carrier bearings 6 being relieved all the more) and the lower the sum of the bearing loads becomes. The wheel contact forces KR (which act in the one direction) are compensated by way of the drive forces KA (which act in the opposite direction). Although, if the vehicle is not in operation, on account of the arrangement of the two power unit bearings on the rear axle carrier which are arranged in front of the wheel center as viewed in the vehicle driving direction, the preloading on the front axle carrier bearing 6 is higher here, this is compensated for during operation of the vehicle by way of the drive forces KA. The higher the drive torque MO here, the more compensation can also be carried out. This has the advantage, in particular, that the axle carrier bearings 6 can be of smaller dimensions on account of the low loads during operation of the vehicle. As a result, installation space can be created and manufacturing complexity can be saved.

The bearing spring 2 lies on the spring link 1, support being carried out on the rear axle carrier 5 via the lever ratios of the spring link 1 on a part of the wheel contact force KR. Here, the load direction is downward as viewed in the vehicle vertical direction H. Here, a drive torque MO for forward driving, in particular in the case of acceleration of the vehicle or in the case of relatively high drive torques MO, is supported on the rear axle carrier 5 and on the vehicle body as viewed in the clockwise direction.

In this specific exemplary embodiment, the drive unit 15 is mounted at only two points on the rear axle carrier 5 (namely in front of the wheel rotational axis D as viewed in the vehicle driving direction), and therefore the wheel contact forces KR are compensated to a predominant extent by way of the drive forces KA in the case of an arrangement according to the invention of the spring link 1 in front of the center M of the spacing of the rear axle carrier bearings 6 which are arranged on in each case one common vehicle side. As a result, the rear axle carrier bearings 6, in particular the rear axle carrier bearings 6 and, in particular, in the case of high drive torques MO, are loaded to a less pronounced extent. A compensation of this type of the wheel contact forces KR by way of the drive forces KA is therefore influenced at least to a small amount by the position and the number of bearings of the drive unit 15 on the rear axle carrier 5. The described effect can nevertheless be determined even without a mounting of the drive unit 15 on the rear axle carrier 5 (although admittedly to a small extent).

Figure 3:
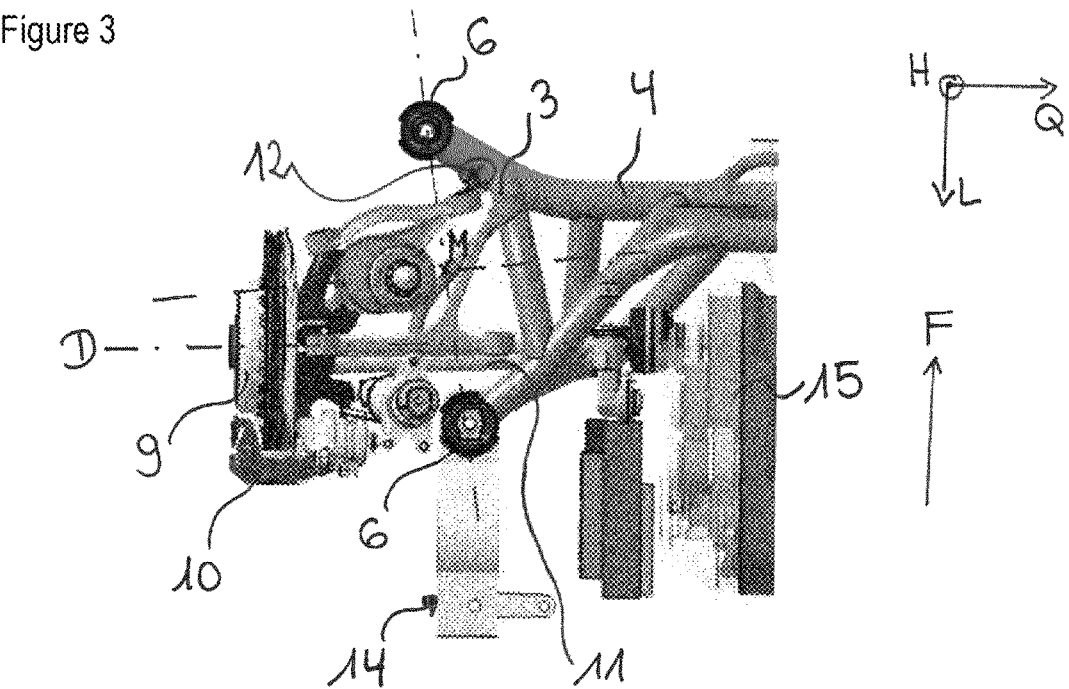
FIG. 3 shows a view of the rear axle from FIG. 1 in a detailed view from above.

FIG. 3, in a plan view of one side of the rear axle, shows by way of example an electric motor propulsion unit 15, the attachment points 13 of which on the rear axle carrier 5 and on the drive shaft 11 are indicated merely diagrammatically. It is provided here that both the rear (as viewed in the vehicle driving direction F) two axle carrier bearings 6 and two power unit bearings (not shown) are supported via a thrust rod 14 on the vehicle body. Here, the thrust rod 14 itself likewise supports the rear (as viewed in the vehicle driving direction F) axle carrier bearing 6 on the vehicle body. It therefore fulfills the function of a two-shear connection of the rear axle carrier 5 (via the rear axle carrier bearings 6) to the vehicle body, and a stop function for the rear axle carrier bearing 6 as a rubber bearing, and also the function of a bearing block for the power unit bearing.

LIST OF DESIGNATIONS

1 Spring link
2 Bearing spring
3 Longitudinal carrier
4 Crossmember
5 Rear axle carrier
6 Axle carrier bearing
8 Wheel support
9 Brake disk
10 Brake caliper
11 Drive shaft
12 Attachment of the spring link to the longitudinal carrier
13 Attachment of the drive unit
14 Thrust rod
15 Electric motor propulsion unit
16 Control arm
Q Vehicle transverse direction
L Vehicle longitudinal direction
H Vehicle vertical direction
F Vehicle driving direction
KA Load on account of drive loads
KR Load on account of wheel loads
MO Drive torque
M Center of the bearing points on the longitudinal carrier
D Rotational axis

What is claimed is:

1. A rear axle of a double track vehicle, comprising:
a plurality of wheel control links with at least one of the plurality of wheel control links being a spring link for supporting a bearing spring on a vehicle body of the vehicle, which wheel control links connect a rear wheel of the vehicle to a rear axle carrier,
wherein the rear axle carrier comprises at least two longitudinal carriers, which are oriented at least approximately in a vehicle longitudinal direction, and at least one crossmember which is oriented at least approximately in a vehicle transverse direction,
wherein the rear axle carrier is attached to the vehicle body via two bearing points on each vehicle side as viewed with regard to a vehicle longitudinal center axis,
wherein the spring link is directly attached to the longitudinal carrier without an intervening component between the spring link and the longitudinal carrier, and wherein at least one other of the wheel control links is attached to the longitudinal carrier, and
wherein the attachment of the spring link to, in each case, one longitudinal carrier is arranged, as viewed in a vehicle driving direction in an installed state, ahead of a center of the spacing of the bearing points which are arranged, in each case, on a common vehicle side, such that a bearing spring support on the spring link is forward of a rotation axis of the rear wheel of the vehicle.

2. The rear axle according to claim 1, wherein
the rear axle carrier further comprises, on in each case one vehicle side at a rear end as viewed in the vehicle driving direction, a rear bearing point and, at a front end as viewed in the vehicle driving direction, a front bearing point for attachment to the vehicle body.

3. The rear axle according to claim 2, wherein
the attachment of the spring link to the longitudinal carrier is arranged in a relatively immediate vicinity of the front bearing point of the longitudinal carrier as viewed in the vehicle driving direction.

4. The rear axle according to claim 1, wherein
the rear axle is driven by way of a propulsion unit, which is arranged on the rear axle carrier, having an electric motor or internal combustion engine or having a combination thereof, and
wherein, in each case, one rear wheel is connected via an output shaft to the propulsion unit.

5. The rear axle according claim 1, wherein
the rear axle carrier comprises a single crossmember.

6. The rear axle according to claim 5, wherein
the single crossmember is connected to the two longitudinal carriers such that the rear axle carrier has a, at least approximately, H-shaped configuration.

7. The rear axle according to claim 6, wherein
the single crossmember is arranged on the longitudinal carrier at least approximately centrally between two link attachment points spaced apart furthest from one another along a length of the longitudinal carrier.

8. The rear axle according to claim 5, wherein
the single crossmember is arranged on the longitudinal carrier at least approximately centrally between two link attachment points spaced apart furthest from one another along a length of the longitudinal carrier.

9. The rear axle according to claim 1, wherein
the spring link is arranged in a lower link plane.

10. A rear axle of a double track vehicle, comprising:
a plurality of wheel control links with at least one of the plurality of wheel control links being a spring link for supporting a bearing spring on a vehicle body of the vehicle, which wheel control links connect a rear wheel of the vehicle to a rear axle carrier,
wherein
the rear axle carrier comprises at least two longitudinal carriers, which are oriented at least approximately in a vehicle longitudinal direction, and at least one crossmember which is oriented at least approximately in a vehicle transverse direction,
the rear axle carrier is attached to the vehicle body via two bearing points on each vehicle side as viewed with regard to a vehicle longitudinal center axis,
the spring link and at least one other of the wheel control links are attached to the longitudinal carrier, and
the attachment of the spring link to, in each case, one longitudinal carrier is arranged, as viewed in a vehicle driving direction in an installed state, ahead of a center of the spacing of the bearing points which are arranged, in each case, on a common vehicle side, such that a bearing spring support on the spring link is forward of a rotation axis of the rear wheel of the vehicle, and
the attachment of the spring link to the longitudinal carrier is arranged in a front third of the longitudinal carrier as viewed in the vehicle driving direction.

* * * * *